Patent text

3,033,817
PRODUCTION OF ALIPHATIC MODIFIED EPOXIDE RESINS

Herbert P. Price and William J. Belanger, Louisville, Ky., assignors to Devoe & Raynolds Company, Inc., Louisville, Ky., a corporation of New York
No Drawing. Filed Oct. 17, 1958, Ser. No. 767,792
2 Claims. (Cl. 260—47)

This invention relates to high molecular weight aliphatic-modified epoxide resins, and includes a new process of producing the resins and the improved resins resulting therefrom.

The improved resins of the present invention are made by reacting a mixture of epichlorohydrin and a dichlorohydrin ether of a polyhydric alcohol, in varying proportions, with polyhydric phenols, with the use of an alkaline dehydrohalogenating agent.

More particularly, the improved resins are made by reacting a mixture of epichlorohydrin and a dichlorohydrin ether of a dihydric alcohol, in varying proportions, with dihydric phenols and with the use of an alkaline dehydrohalogenating agent.

Epoxide resins have heretofore been commonly produced by the reaction of epichlorohydrin with dihydric phenols, with the use of an alkaline agent such as caustic alkali, and with the use of an excess of the epichlorohydrin to produce terminal glycidyl groups in the epoxy resins.

According to the present invention, both epichlorohydrin and a dichlorohydrin ether of a polyhydric alcohol are caused to react with the polyhydric phenol in the presence of an alkaline material, such as caustic alkali, and with proportions of the epichlorohydrin, dichlorohydrin ether and polyhydric phenol to give high molecular epoxide resins with terminal glycidyl groups.

The use of the dichlorohydrin ethers of the dihydric alcohols, together with epichlorohydrin, for reaction with the dihydric phenol, gives resins with added aliphatic groups or residues, which have improved solubility and lower melting points and other desirable properties, as compared with resins of similar molecular weight made from dihydric phenols and epichlorohydrin. The new resins contain phenolic residues from the dihydric phenol, and aliphatic residues from the dichlorohydrin ether of the dihydric alcohol, as well as residues of the epichlorohydrin, including terminal epoxide or glycidyl groups.

The dichlorohydrin ethers of the polyhydric alcohols can be readily prepared by reacting the polyhydric alcohol with epichlorohydrin in the presence of a condensation catalyst, advantageously of the $BF_3$ type, such as boron trifluoride ether complex or etherate. The reaction is an addition reaction between the epoxy group of the epichlorohydrin and the hydroxyl groups of the alcohol. In this reaction, no excess of epichlorohydrin is necessary in the formation of the chlorohydrin ethers and all or substantially all of the epichlorohydrin initially added to the polyhydric alcohol is caused to react therewith. The products are mainly dichlorohydrin ethers admixed with small amounts of monofunctional chlorohydrin ethers. Most of the chlorine of the chlorohydrin ethers is active chlorine, but some small amount is usually present as inactive chlorine, as hereinafter explained.

The polyhydric alcohols used in producing the dichlorohydrin ethers contain at least 2 hydroxyl groups, and may contain more than 2 hydroxyl groups. Polyhydric alcohols having a hydrocarbon chain between the two hydroxyl groups are advantageous in imparting an added aliphatic hydrocarbon element or residue into the dichlorohydrin ethers and in the final epoxide resins made therefrom. Among such alcohols are ethylene glycol, butanediol, pentanediol, diethylene glycol, triethylene glycol, hexanetriol, glycerol and various polyethylene glycols and polypropylene glycols, etc.

The polyhydric alcohols used in forming the chlorohydrin ethers include dihydroxyalkyl ethers of dihydric phenols, for example, the dihydroxyethyl ethers of bisphenol, resorcinol, etc.

Where the polyhydric alcohol contains more than 2 hydroxyl groups, the dichlorohydrin ethers will still contain one or more reactive hydroxyl groups in addition to the 2 chlorohydrin ether groups, e.g., a dichlorohydrin ether of a trihydric alcohol.

The polyhydric phenols include dihydric phenols such as have heretofore been used in the production of epoxide resins by reaction with epichlorohydrin in the presence of caustic alkali, of which resorcinol, hydroquinone and bisphenol (essentially p,p'-dihydroxy diphenyl dimethyl methane) are examples.

The proportions of epichlorohydrin, dichlorohydrin ether of the dihydric alcohol, and dihydric phenol can be varied. Varying proportions of epichlorohydrin and dichlorohydrin can be used with the same amount of a dihydric phenol, and with varying amounts of the same or different dihydric phenols.

In general, the amount of epichlorohydrin and dichlorohydrin ether together should be in excess of that which is equivalent to the dihydric phenol, so that epoxide resins containing terminal epoxy groups will be obtained. Both epichlorohydrin and the dichlorohydrin ethers are difunctional, and the dihydric phenol is also difunctional.

The ratio of epichlorohydrin to dichlorohydrin ether can be varied to give products of varying properties. The ratio may thus vary from 9 mols of epichlorohydrin to 1 of dichlorohydrin ether, to 9 mols of dichlorohydrin ether to 1 of epichlorohydrin. With the smaller ratios of dichlorohydrin ether to epichlorohydrin, the epoxide resins produced are modified epoxide resins, with the added aliphatic groups and residues imparted by the dichlorohydrin ethers. This modification is further increased with the higher ratios of dichlorohydrin ethers.

The ratio of difunctional chlorohydrins (epichlorohydrin and dichlorohydrin ether together), with relation to the dihydric phenol, should be such that there is a molecular excess of the chlorohydrin sufficient to give terminal epoxy groups in the product produced by dehydrohalogenation. In general, the minimum number of mols of difunctional chlorohydrin (epichlorohydrin plus dichlorohydrin ether) should be equivalent to the number of mols of dihydric phenol, and with a sufficient excess to insure the production of terminal epoxide groups in the product of the dehydrohalogenation. Higher ratios of combined epichlorohydrin and dichlorohydrin ether to dihydric phenol can be used, up to e.g. 2 mols (epichlorohydrin plus dichlorohydrin ether) to 1 mol of dihydric phenol or somewhat more. For practical purposes, the ratio will in general be between about 1 mol of difunctional chlorohydrins (epichlorohydrin plus dichlorohydrin ether) to 1 mol of dihydric phenol, up to about 2 mols of difunctional chlorohydrins to 1 mol of dihydric phenol.

With varying ratios of difunctional chlorohydrin ether to dihydric phenol, the ratio of epichlorohydrin to dichlorohydrin ether will also be varied.

The reaction between the dihydric phenol, the epichlorohydrin and the dichlorohydrin ether is brought about with the use of alkaline agents, such as caustic alkali, which act as dehydrohalogenating agents, including alkaline agents which are effective dehydrohalogenating agents for the dichlorohydrin ether and which are active agents in producing epoxide resins from epichlorohydrin and dihydric phenols.

The reaction can be carried out in an organic solvent such as dioxane, methyl isobutyl ketone, xylol, etc., using sodium hydroxide as the alkaline reagent.

It is one advantage of the present process, however, that it can be carried out with the use of aqueous alkali and in a manner similar to that used in the production of epoxide resins from dihydric phenols and epichlorohydrin.

Different alkaline agents can be used, including alkali metal complexes and salts such as sodium silicate, sodium aluminate, sodium zincate, etc. But it is one advantage of the present process that caustic alkali acn be used in aqueous solution for carrying out the process.

The amount of alkali used is based on the amount required to dehydrohalogenate the dichlorohydrin ether and the epichlorohydrin together with a small excess over this amount.

In the chlorohydrin ethers which are formed in the manner above described, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1) 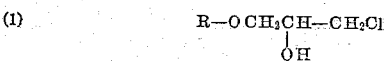

This compound is easily dehydrohalogenated to give an epoxide compound.

Inactive chlorines are formed by the addition of epichlorohydrin to the hydroxyl group in the above compound.

(2) 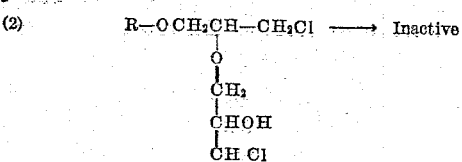

The above labeled chlorine cannot be removed to form an epoxide group since no hydroxyl is present on an adjacent carbon.

Resins of a wide range can be prepared by varying the proportions of dichlorohydrin ethers of polyhydric alcohols, of epichlorohydrin, and of the dihydric phenol. Larger proportions of the dichlorohydrin ether impart added aliphatic properties to the composite aliphatic-aromatic epoxide resins produced. Products of a higher or lower melting point and of varying degrees of complexity are produced, depending upon the proportions of the three materials reacted.

The products produced by the present process are composite products of a distinctive nature in that they combine the residues of the epichlorohydrin and of the dichlorohydrin ether in the product as well as the residues of the polyhydric phenol. And the products are characterized by containing as terminal epoxy groups both glycidyl groups united directly to a dihydric phenol and glycidyl ether groups resulting from the dehydrohalogenation and reaction of the dichlorohydrin ethers.

Depending upon the proportions of epichlorohydrin and dichlorohydrin ether used, the terminal groups may be preponderantly glycidyl groups united directly to the dihydric phenol residue or aliphatic glycidyl ether groups derived from the dichlorohydrin ethers.

The reaction of 1 mol of epichlorohydrin plus 1 mol of the dichlorohydrin ether of a dihydric alcohol such as glycol with 1 mol of a dihydric phenol such as bisphenol gives a product on dehydrohalogenation which can be considered to have the following formula:

(I) 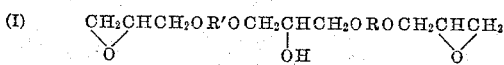

In this formula, R' is the hydrocarbon radical of the aliphatic alcohol, e.g., in the case of glycol —$CH_2CH_2$—; and R is the hydrocarbon residue of the dihydric phenol such as bisphenol. In this formula, it will be seen that the reaction of the epichlorohydrin results in the introduction of a glycidyl group joined to the dihydric phenol residue, while the use of the dichlorohydrin ether results in the production of an aliphatic glycidyl ether group joined to the dihydric phenol.

Monomeric products may also be formed in which 2 mols of the dichlorohydrin ether are reacted with 1 mol of dihydric phenol to form a product such as illustrated by the following formula:

(II) 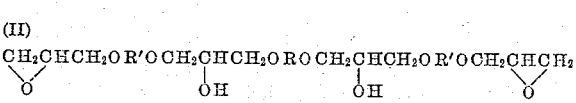

where both of the groups joined to the dihydric phenol residue are aliphatic glycidyl ether groups. Similarly, and particularly where an excess of epichlorohydrin is used in relation to the dichlorohydrin ether, the reaction may in part take place to produce a diglycidyl ether of the dihydric phenol such as illustrated by the following formula:

(III) 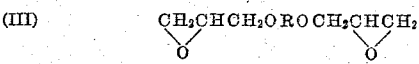

In actual practice, it is probable that all of these reactions take place to some extent and that more complex and polymeric reactions also take place to form more complex products, such as illustrated by the formulas IV and V, as follows:

(IV) 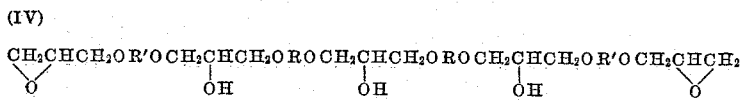

(V) 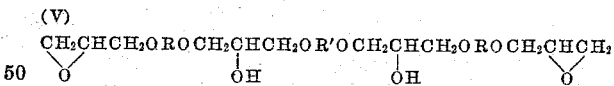

In the product of Formula IV, R' and R have the same meaning above indicated, and the product is one in which the epichlorohydrin residue is an intermediate residue between the phenolic residues, while the terminal groups are the complex glycidyl ether groups.

In the product of Formula V, the terminal groups are glycidyl groups united directly to the dihydric phenol, and the intermediate group is the residue of the dichlorohydrin ether after dehydrohalogenation and reaction with the dihydric phenol.

The following Formula VI illustrates polymeric products containing both terminal glycidyl groups united directly to the dihydric phenol, and aliphatic glycidyl ether residues united to the dihydric phenol and with intermediate groups which may be residues of either the epichlorohydrin or of the dichlorohydrin ether, or both.

(VI) 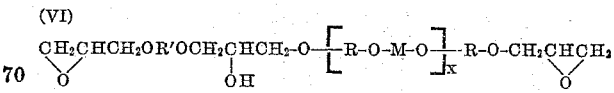

In this formula, R' and R have the meaning above indicated, M represents an intermediate residue which may be a residue of the dichlorohydrin ether (as illustrated in Formula V) or a residue of the epichlorohydrin (as illustrated in Formula IV) or, with products of higher polymerization, including both of these residues, and X indicates the extent of polymerization, e.g., 1, 2, 3, 4, 5, etc.

While the products produced may contain, to some extent, products having formulas such as illustrated in Formulas II, III, IV and V, they are to an important extent products of the type illustrated in Formulas I and VI, which contain in the same molecule both a glycidyl group joined directly to the dihydric phenol residue, as well as an aliphatic alcohol glycidyl ether group derived from the dichlorohydrin ether.

The following description and examples further illustrate the invention, but it will be understood that the invention is not limited thereto.

Examples 1 to 7 illustrate the production of the dichlorohydrin ethers of the polyhydric alcohols.

Example 1

To a one liter flask equipped with stirrer, thermometer, condenser and addition tube was added 180 grams (2 mols) of 1,4-butanediol and 1 cc. of $BF_3$ etherate (47% $BF_3$). This solution was heated to 60° C. where dropwise addition of 370 grams (4 mols) of epichlorohydrin was begun. The epichlorohydrin was added over a period of two hours and fifteen minutes, the temperature being controlled between 60–70° C. by external cooling. After the exothermic reaction was over, the temperature was raised to 75° C. to insure complete reaction. This product analyzed 20.9% active chlorine, 25.8% total chlorine.

Example 2

To a one liter flask equipped as in Example 1, was added 307 grams (2.29 mols) of trimethylol propane. The temperature was raised to 56° C. to melt the TMP, at which point heat was removed and 1 cc. of $BF_3$ etherate was added. Dropwise addition of epichlorohydrin, 424 grams (4.58 mols) was begun and continued over a period of three hours. The temperature of the exothermic reaction was controlled between 60–70° C. by external cooling and rate of epichlorohydrin addition. This product had an active chlorine content of 19.2%, total chlorine 22.2%.

Example 3

To a one liter flask, equipped with condenser, stirrer, and thermometer was added 300 grams (½ mol) of polyethylene glycol 600 and 92.5 grams epichlorohydrin (1 mol). When solution was attained, 1 cc. of $BF_3$ etherate was added. The temperature of the reaction was controlled between 25–35° C. for three hours and then was raised to 50° C. to insure complete reaction. The product contained 8.2% active chlorine, 9.0% total chlorine.

Example 4

In a similar manner, the dichlorohydrin ether of polyethylene glycol 750 was produced containing 6.5% active chlorine and 7.6% total chlorine.

Example 5

In a similar manner, the dichlorohydrin ether of polypropylene glycol 1200 was produced with 5.14% active chlorine and 5.14% total chlorine.

Example 6

In a similar manner, the dichlorohydrin ether of polypropylene glycol 400 was produced with 10.04% active chlorine and 12.1% total chlorine.

The following example illustrates the production of a dichlorohydrin ether of a dihydric alcohol, containing intermediate aromatic groups such as the dihydroxydiethyl ether of bisphenol prepared by the reaction of 2 mols of ethylene chlorohydrin with 1 mol of bisphenol with the use of caustic soda as a condensing or dehydrohalogenating agent.

Example 7

To a two liter flask equipped with a condenser, thermometer, stirrer and dropping funnel was added 616 grams of the di(hydroxyethyl) ether of bisphenol (2 mols based on percent OH=11.05). This material was heated to 100° C. in order to melt it and 25 grams of epichlorohydrin was added to it. At 790° C. 1 cc. of $BF_3$ etherate (47% $BF_3$) was added. The reaction exothermed to 83° C. Gradual addition of epichlorohydrin was begun at this point. The temperature was controlled between 80–85° C. by the rate of epichlorohydrin addition and by the application of an external cold water bath. All the epichlorohydrin (370 grams, 4 mols) was added over a period of one hour. Five grams of water was then added. This material analyzed as containing 10.9% active chlorine, 14.4% total chlorine.

The following examples illustrate the reaction of the dichlorohydrin ethers with a dihydric phenol and excess epichlorohydrin with dehydrohalogenation to produce the aliphatic-modified epoxy resins.

In the examples, where mols of the dichlorohydrin ethers of the polyhydric alcohol are referred to, it is assumed that 1 mol contains 2 active halogens on 2 chlorohydrin groups, and the number of mols indicated in the examples is based on the active chlorine content of the dichlorohydrin ether, as determined by analysis.

Example 8

To a two liter flask equipped with stirrer, condenser, and thermometer was added 228 grams bisphenol (1 mol), 1000 cc. of $H_2O$, and 88 grams NaOH (2.2 mols, equivalent+10% excess). When solution was attained, 169 grams of the dichlorohydrin ether of 1,4-butanediol of Example 1 (0.5 mol based on active chlorine content of chlorohydrin ether) and 92.5 grams of epichlorohydrin (1 mol) was added. Heat was applied to raise the temperature to 100° C. (30 minutes). The temperature was held at 100° C. for 30 minutes. The aqueous salt layer was decanted off, and the resin was washed with hot water until neutral to litmus. The resin was dried by heating to 150° C. with vigorous agitation. The product in 93% yield (385 grams) had a weight/epoxide of 650, total chlorine 1.8%, active chlorine 0.5%, Durran's M.P. 56° C., Gardner viscosity (40% N.V. in butyl Carbitol) E–F.

In this and the following described examples one mol of the dichlorohydrin ether of the polyhydric alcohol has the same functionality as one of epichlorohydrin. Functionalitywise the above resin is a 1.5 to 1 resin wherein the chlorohydrins total 1.5 (1 mol epichlorohydrin+0.5 mol chlorohydrin ether) and bisphenol is 1.

Example 9

This resin was a 1.5 to 1 resin prepared in the same manner as in Example 8. The reactants were added in the following order: bisphenol 228 grams (1 mol), water 1000 cc., NaOH 92 grams (2.3 mols, equivalent +15% excess), dichlorohydrin ether of trimethylol propane of Example 2 (active chlorine 19.2%) 185 grams (0.5 mol) and epichlorohydrin 92.5 grams (1 mol). The product was produced with a yield (402 grams) of 93%, weight/epoxide of 732, total chlorine 1.0%, active chlorine 0.2%, Durran's M.P. 80.5° C., Gardner viscosity (40% N.V. in butyl Carbitol) G–H.

Example 10

This resin was a 2.34 to 1 resin prepared in the same manner as in Example 8 from the following reactants: bisphenol 114 grams (0.5 mol), water 1000 cc., NaOH 88 grams (2.2 mols, equivalent +10% excess), dichlorohydrin ether of 1,4-butanediol (active chlorine 21.4%) 275 grams (0.83 mol), epichlorohydrin 31.8 grams (0.34 mol). The product was produced with a weight/epoxide of 577, total chlorine 3.2%, active chlorine 0.4%, Durran's M.P. less than 30° C., Gardner viscosity (40% N.V. in butyl Carbitol) A–B.

Example 11

This resin was a 1 to 1 resin prepared in the same manner as in Example 8 from the following reactants: bisphenol 228 grams (1 mol), water 750 cc., NaOH 72 grams (1.8 mols, equivalent +20% excess), dichlorohydrin ether of 1,4-butanediol (Example 1) 169 grams (0.5 mol), epichlorohydrin 46.5 grams (0.5 mol). The product was produced with a yield (277 grams) of 97%, weight/epoxide of 8038, total chlorine 2.2%, active chlorine 0.4%, Durran's M.P. 93.5° C., Gardner viscosity (40% N.V. in butyl Carbitol) U–V.

Example 12

This resin was a 1.075 to 1 resin, prepared in the same manner as in Example 8 from the following reactants: bisphenol 228 grams (1 mol), water 750 cc., NaOH 55 grams (1.375 mols, equivalent +20% excess), dichlorohydrin ether of polypropylene glycol 1200 (Example 5) 104 grams (0.075 mol), epichlorohydrin 92.5 grams (1 mol). The product was produced with a yield (366 grams) of 97%, weight/epoxide of 2960, total chlorine 0.4%, active chlorine 0%, Durran's M.P. 89° C., Gardner viscosity (40% N.V. in butyl Carbitol) T–U.

Example 13

This resin was a 1.075 to 1 resin prepared in the same manner as in Example 8 from the following reactants: bisphenol 228 grams (1 mol), water 750 cc., NaOH 59 grams (1.475 mols, equivalent +10% excess), dichlorohydrin ether of polypropylene glycol 400 (Example 6) 104 grams (0.15 mol), epichlorohydrin 86 grams (0.925 mol). The product was produced with a yield (362 grams) of 97%, weight/epoxide of 3763, total chlorine 0.8%, active chlorine 0%, Durran's M.P. 102° C., Gardner viscosity (40% N.V. in butyl Carbitol) V–W.

The new composite resins of the present invention are, in general, useful for purposes for which epoxide resins made from dihydric phenols and epichlorohydrin are used. They are distinguished by their content of the aliphatic residue of the chlorohydrin ethers of the polyhydric alcohols as well as by their residues of the dihydric phenol and their terminal epoxide or glycidyl groups.

These epoxide resins can be cured with amine catalysts such as diethylene triamine or metaphenylene diamine or other curing agents, such as urea-formaldehyde resins, melamine formaldehyde resins, toluene diisocyanate, etc.

We claim:

1. The method of producing composite aliphatic-modified epoxide resins which comprises forming a mixture of epichlorohydrin, a dichlorohydrin ether of a polyhydric alcohol, and a dihydric phenol, and subjecting the mixture to a dehydrohalogenation reaction with an alkaline dehydrohalogenating agent, the mol proportions of dichlorohydrin ether to epichlorohydrin varying from about 9 to 1 to about 1 to 9, and the mol proportions of dichlorohydrin ether plus epichlorohydrin to dihydric phenol varying from about 1 to 1 to not more than 3 to 1.

2. Composite aliphatic modified epoxide resins produced in accordance with the process of claim 1.

References Cited in the file of this patent
UNITED STATES PATENTS
2,581,464    Zech _____ Jan. 8, 1952

UNITED STATES PATENT OFFICE
CERTIFICATE OF CORRECTION

Patent No. 3,033,817                        May 8, 1962

Herbert P. Price et al.

It is hereby certified that error appears in the above numbered patent requiring correction and that the said Letters Patent should read as corrected below.

Column 3, line 9, for "acn" read -- can --; lines 33 to 39, formula "(2)" should appear as shown below instead of as in the patent:

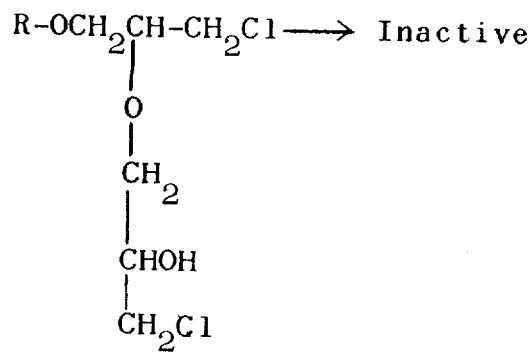

column 6, line 7, for "790° C." read -- 79° C. --.

Signed and sealed this 28th day of August 1962.

(SEAL)
Attest:

ESTON G. JOHNSON                       DAVID L. LADD
Attesting Officer                    Commissioner of Patents